(12) United States Patent
Tadepalli et al.

(10) Patent No.: US 6,377,420 B1
(45) Date of Patent: Apr. 23, 2002

(54) HUB CAP ACTUATOR DAMPER FOR DISC DRIVES

(75) Inventors: Srinivas Tadepalli, Oklahoma City; Roy Lynn Wood, Yukon, both of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/665,815

(22) Filed: Sep. 20, 2000

Related U.S. Application Data

(60) Provisional application No. 60/158,879, filed on Oct. 12, 1999.

(51) Int. Cl.$^7$ .............................................. G11B 33/14
(52) U.S. Cl. .................................................... 360/97.02
(58) Field of Search ........................... 360/97.02, 97.03, 360/98.01

(56) References Cited

U.S. PATENT DOCUMENTS

| | | | |
|---|---|---|---|
| 3,658,635 A | * 4/1972 | Eustice | 428/425.8 |
| 4,491,888 A | * 1/1985 | Brown et al. | 360/97 |
| 5,214,549 A | 5/1993 | Baker et al. | 360/97.02 |
| 5,282,100 A | 1/1994 | Tacklind et al. | 360/97.02 |
| 5,282,101 A | 1/1994 | Reinisch | 360/97.03 |
| 5,474,840 A | * 12/1995 | Landin | 428/450 |
| 5,483,397 A | 1/1996 | Gifford et al. | 360/97.01 |
| 5,483,398 A | * 1/1996 | Boutaghou | 360/97.02 |
| 5,587,855 A | 12/1996 | Kim | 360/97.02 |
| 5,666,239 A | * 9/1997 | Pottebaum | 360/97.03 |
| 5,670,006 A | * 9/1997 | Wilfong et al. | 156/236 |
| 5,677,813 A | 10/1997 | Odawara et al. | 360/97.02 |
| 5,725,931 A | * 3/1998 | Landin et al. | 428/134 |
| 5,761,184 A | 6/1998 | Dauber et al. | 369/247 |
| 5,781,373 A | 7/1998 | Larson et al. | 360/97.02 |
| 5,825,585 A | * 10/1998 | Hatam-Tabrizi | 360/97.02 |
| 5,851,327 A | * 12/1998 | Landin | 156/71 |
| 5,858,509 A | * 1/1999 | Polch et al. | 428/166 |
| 5,875,067 A | 2/1999 | Morris et al. | 360/97.01 |
| 5,939,179 A | * 8/1999 | Yano et al. | 428/212 |
| 5,982,580 A | 11/1999 | Woldemar et al. | 360/97.02 |
| 6,005,750 A | * 12/1999 | Willard et al. | 360/104 |
| 6,075,672 A | * 6/2000 | Morris et al. | 360/97.01 |
| 6,081,406 A | * 6/2000 | Morris et al. | 360/97.01 |
| 6,256,165 B1 | * 7/2001 | Kim | 360/97.01 |

FOREIGN PATENT DOCUMENTS

JP 09073741 A * 3/1997 ........... G11B/21/02

* cited by examiner

Primary Examiner—William Klimowicz
(74) Attorney, Agent, or Firm—John R. Wahl; Merchant & Gould P.C.

(57) ABSTRACT

A disc drive having reduced mechanical vibration is disclosed. An annular viscoelastic damper is sandwiched beneath the head disc assembly cover against the bearing assembly of the actuator to dampen mechanical vibrations transmitted by the cover to the actuator assembly. The damper is an annular disc made of a composite of a layer of viscoelastic polymer and a backing stiffening layer.

10 Claims, 3 Drawing Sheets

HUB CAP ACTUATOR DAMPER FOR DISC DRIVES

RELATED APPLICATIONS

This application claims the benefit of priority of U.S. Provisional Application Ser. No. 60/158,879, filed Oct. 12, 1999, entitled HUB-CAP ACTUATOR DAMPER FOR VIBRATION ATTENUATION.

FIELD OF THE INVENTION

This application relates generally to digital data storage devices and more particularly to a vibration damper for an actuator assembly in a disc drive.

BACKGROUND OF THE INVENTION

The positioning accuracy of an actuator in a head disc assembly (HDA) of a disc drive must increase in order to achieve the increased aerial densities required of newer generations of disc drives. This accuracy depends substantially on the servo bandwidth and is limited by the inherent mechanical resonances of the actuator body or "E-block", the head suspension assembly (HSA) and disc pack vibration modes. There has been considerable progress in designing robust control systems that minimize the sensitivity to excitation forces. However, the systems cannot compensate completely for all mechanical resonances. Some of the vibration energy, due to such sources as disc pack rocking and translation modes, spindle bearing modes, and disc flow induced vibration modes, is transmitted through the disc drive motor spindle mounting screw fastened to the top cover of the HDA. These vibrations are in turn transmitted to the actuator through the top cover screw fastening the top cover to the actuator assembly. During installation, any misalignment of the top cover and actuator shaft holes induces transverse loads that increase the translational mode of the actuator.

In general, a higher servo bandwidth frequency provides greater immunity to all disturbances which cause head to track misregistration. The main reason for not going to very high bandwidths, however, is that actuator assembly resonances with a high gain in the off-track direction can cause servo instability. If the bandwidth is close to a resonant frequency with high gain, ringing will occur. This is very detrimental. Specifically, if the gain curve of an open loop bode plot exceeds zero decibels after the gain crossover frequency and before the phase curve is below −90 degrees, then unstable servo oscillations will occur. Typically, for every octave above the gain crossover, the resonant peak can be 3–4 db above the baseline response before 0 db will be crossed. In other words, the typical gain curve drops 3–4 db/octave after the gain crossover. In typical disc drive actuators the first resonance, which limits the bandwidth because of the modal gain, is the actuator translational mode. Attempts made to increase the frequency of this mode are usually met with very limited success. Accordingly, there is a need for a disc drive that has a damped translational mode where the transmission of these vibrations to the actuator assembly is minimized.

SUMMARY OF THE INVENTION

The hub cap actuator damper in accordance with the present intention damps actuator vibrations and improves the head on track performance. Lowering the gain of the mode so that the bandwidth can be placed close to the mode without the peak crossing zero db does this. The hub cap damper is an annular vibration absorbing disc placed between the cover and the actuator bearing cartridge which dissipates the energy in the visco-elastic layer and provides acoustic isolation between the disc motor spindle and the actuator assembly. Further, this isolation also improves the operational shock level the disc drives can withstand due to the actuator and spindle coupling. The deformations which take place in the translational mode put virtually all the reaction force on the actuator shaft which is in turn restrained by the base and the top cover. All of the materials that share in the modal strain of the translational mode have very low loss factors. The addition of an annular vibration-absorbing disc placed between the cover and the actuator bearing cartridge adds a high loss factor material in an area that has significant modal strain thus reducing the gain or amplitude of the resonance.

These and various other features as well as advantages which characterize the present invention will be apparent from a reading of the following detailed description and a review of the associated drawings.

DETAILED DESCRIPTION

Figure 1:
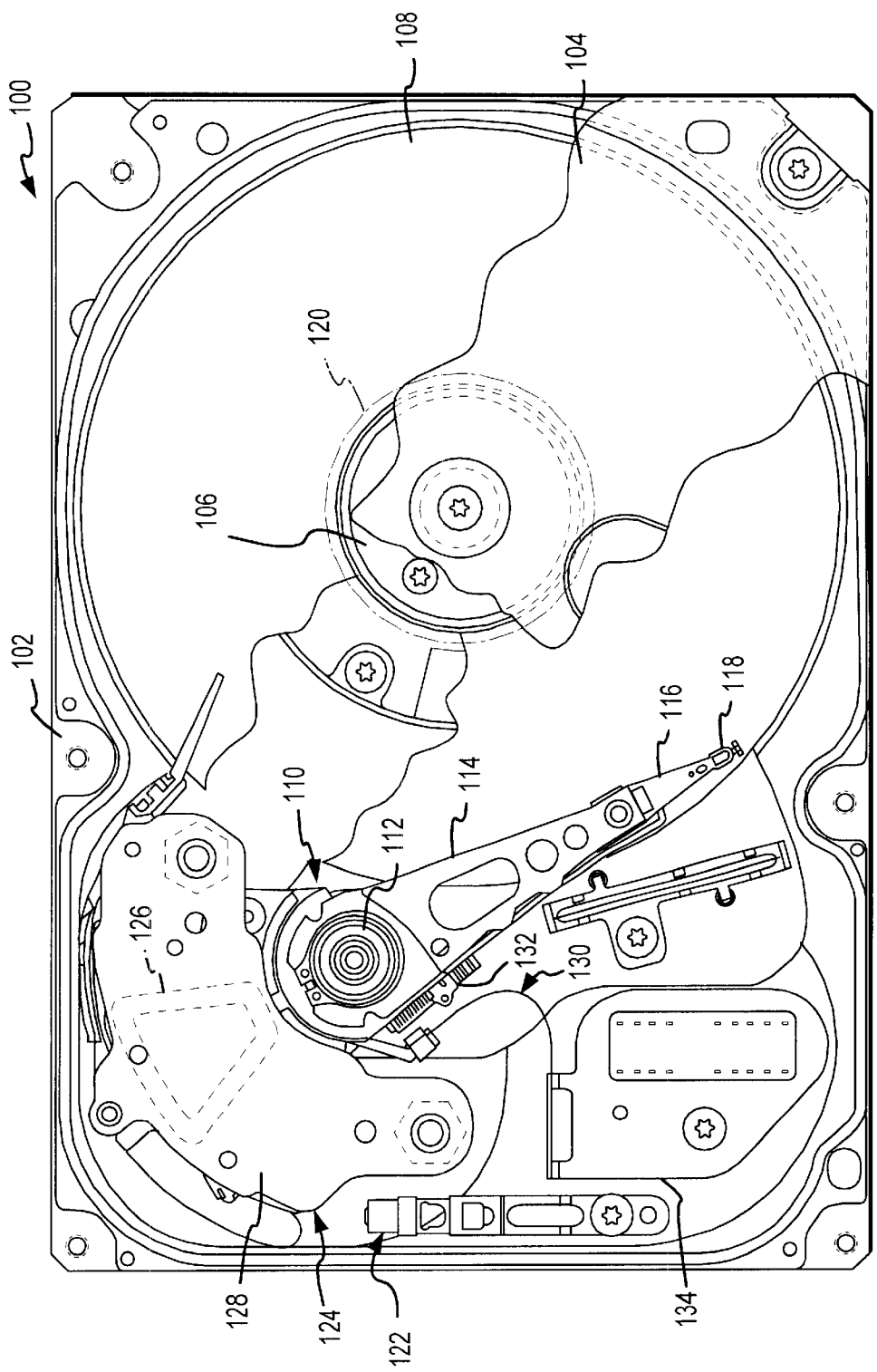
FIG. 1 is a plan view of a disc drive with portions of the cover broken away to reveal the internal components of the head disc assembly.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. This assembly is called a head disc assembly (HDA). The components include a spindle motor 106 which rotates one or more discs 108 at a constant high speed. Information is written to and read from tracks on the discs 108 through the use of an actuator assembly 110, which rotates about a bearing shaft assembly or bearing cartridge 112 positioned adjacent the discs 108. The actuator assembly 110 includes a plurality of actuator arms 114 carried by the bearing cartridge 112 which extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

The heads 118 are typically positioned over park zones 120 near the inner diameter of the discs 108 when the spindle motor is not spinning. The heads 118 are secured over the park zones 120 through the use of an actuator latch arrangement 122, which prevents inadvertent rotation of the actuator arms 114 when the heads are parked.

The radial position of the heads 118 is controlled through the use of a voice coil motor (VCM) 124, which typically includes a coil 126 attached to the actuator assembly 110, as well as one or more permanent magnets and return plates 128 which are spaced apart and establish a vertical magnetic field between them in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the stationary shaft in the bearing cartridge 112 and the heads 118 are caused to move across the surfaces of the discs 108. The stationary shaft of the bearing cartridge 112 typically is bolted to the baseplate 102 and to the cover 104.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket and pass-through 134 for communication through the base 102 to a disc drive printed circuit board (not shown) typically mounted to the bottom side of the disc drive 100.

Figure 2:
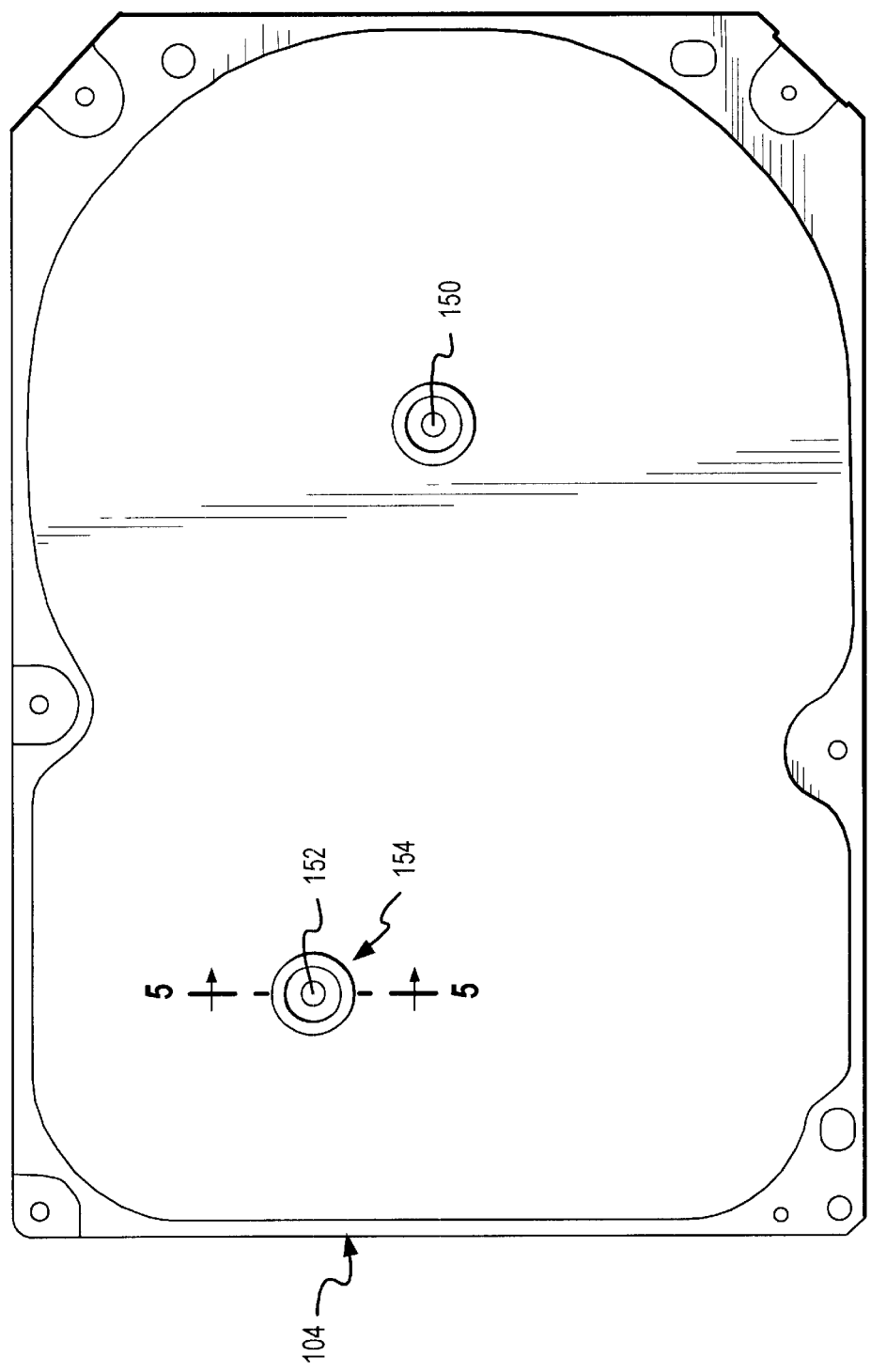
FIG. 2 is a perspective view of the inside surface of the top cover shown removed from the head disc assembly shown in FIG. 1.

FIG. 2 shows the underside of the top cover 104 removed from the disc drive 100. There are two holes 150 and 152 through the top cover 104. The hole 150 receives a screw (not shown) which fastens the cover 104 to the spindle of the drive motor 106. The hole 152 receives a screw (not shown) which fastens the cover 104 to the spindle shaft of the bearing shaft assembly or cartridge 112 of the actuator assembly 110. An annular hub damper 154 is positioned around the hole 152, between the bearing cartridge 112 and the cover 104. This damper 154, when the HDA is assembled, absorbs a significant amount of the mechanical vibrations that are transmitted through the cover 104 to the actuator assembly 110.

Figure 5:
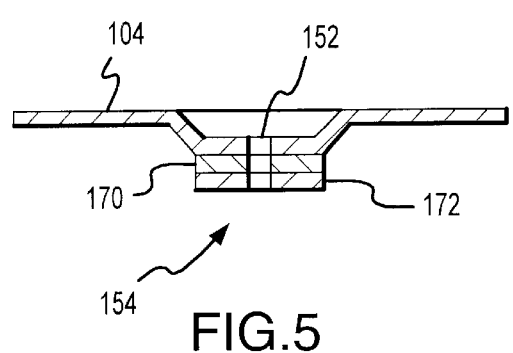
FIG. 5 is an enlarged cross sectional view of a portion of the cover through a damper in accordance with a preferred embodiment of the invention taken along the line 5—5 in FIG. 2.

The damper 154 is shown in an enlarged sectional view in FIG. 5. The damper 154 is a generally flat composite laminate of an annular disc 170 of viscoelastic damping polymer such as 3M's ISD-142 backed by a stiffening or constrain layer 172 of a material such as an annular disc of polyurethane or polyethylene terathylate (PET). Alternatively, the polyurethane may be replaced with a disc of aluminum in a second configuration. An additional damper 154 may optionally be installed on the base 102 beneath the bearing assembly 112 of the actuator assembly 110. The damper 154 may be alternatively constructed of multiple layers each having particular damping characteristics. The damper 154 may include an adhesive layer to keep it in place against the cover 104 when the cover is removed from the HDA. Alternatively, the viscoelastic layer 170 may have an adhesive quality itself to perform this function in the place of a separately applied adhesive.

Figure 3:
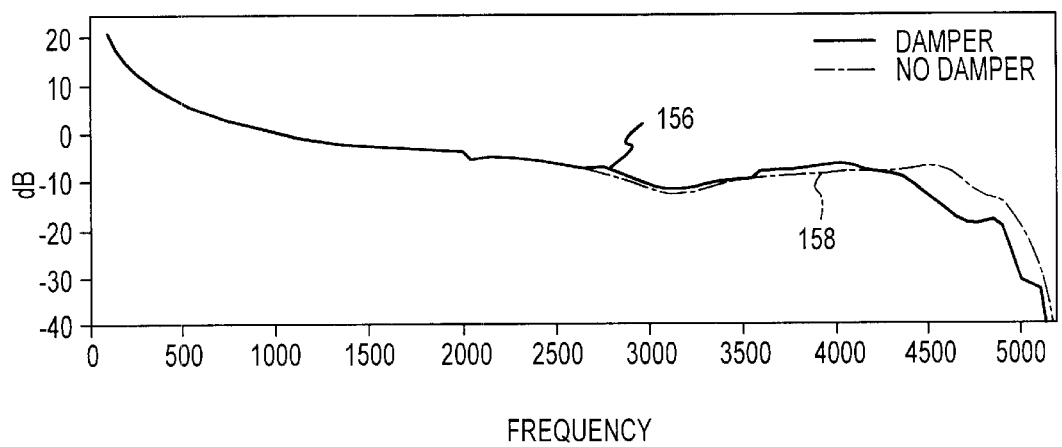
FIG. 3 is a graph of amplitude (in dB) versus frequency for a disc drive with and without the damper shown in FIG. 2.

FIG. 3 is a graph of off-track head signal amplitude in decibels (dB) versus frequency in Hertz (Hz) experienced by the actuator arms 114 in a head disc assembly 100 during operation utilizing a first configuration, as shown in the sectional view of FIG. 5, of a damper 154. This first configuration is an annular disc 170 of ISD-142 material (made by 3M Corporation) that is 8 mils thick with a 4.6 mil thick backing layer 172 of polyurethane. The solid line 156 in FIG. 3 is a the head noise signal for the disc drive 100 with the damper 154 installed between the cover 104 and the bearing shaft assembly 112. The dashed line is that of the disc drive 100 under the same operating conditions without the damper 154 installed. As can readily be seen, there is a steeper roll off in amplitude above 4 kHz and the amplitude peaks of the mechanical resonances are reduced when the damper 154 is present. This region above 4kHz is generally outside the servo bandwidth of current servo control systems and head disturbances in this region are amplified. Any improvement in the viration attenuation is of great importance in achieving higher data storage densities (e.g. tracks per inch).

Figure 4:
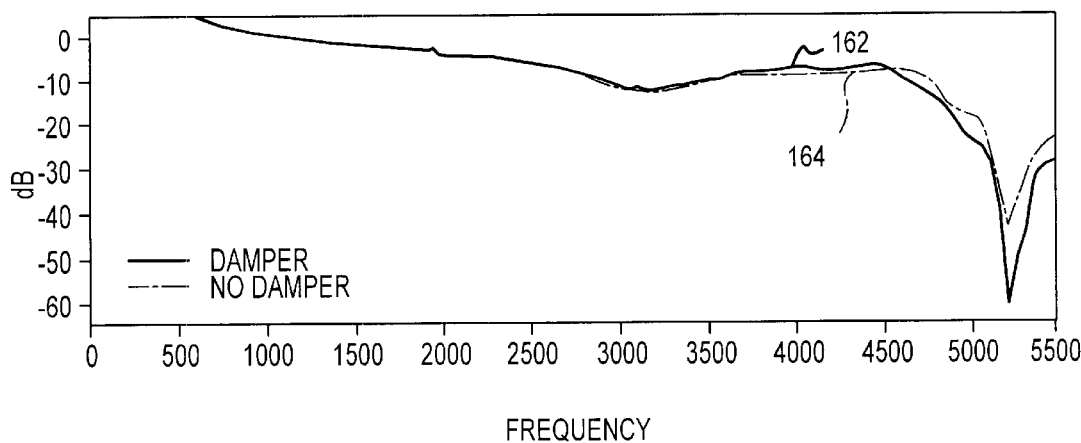
FIG. 4 is a graph of amplitude (in dB) versus frequency for a disc drive with and without a damper as in FIG. 2 having an alternative configuration.

A response graph for a second configuration of the damper 154 is shown in FIG. 4. This second configuration is an annular disc made of an 8 mil layer of ISD-142 (made by 3M Corporation) backed by a 3 mil layer of aluminum. As in the graph of FIG. 3, the solid line 162 in FIG. 4 represents the drive 100 with the damper 154 installed and the dashed line 164 represents the drive 100 without the damper 154 installed. Again, there is a steeper roll off in amplitude above 4 kHz and the amplitude peaks of the mechanical resonances are reduced when the damper 154 is present between the bearing shaft assembly 112 and the cover 104.

In summary, the present invention may be viewed as a disc drive (such as 100) that has a rotatable disc (such as 108) carried by a spin motor (such as 106) mounted to a base plate (such as 102). The disc has a data storage media thereon, and there is an actuator assembly (such as 110) rotatably supported adjacent the disc (such as 108) between the base plate (such as 102) and a cover (such as 104) over the actuator assembly (such as 110), the disc (such as 108) and the spin motor (such as 106). The drive (such as 100) has a bearing cartridge (such as 112) fastened to the baseplate (such as 102) and to the cover (such as 104) that supports the actuator assembly (such as 110) for rotation about an axis parallel to a rotation axis of the disc (such as 108). A visco-elastic damper (such as 154) is fastened between the bearing cartridge (such as 112) and the cover (such as 104). The damper (such as 154) absorbs vibrations transmitted by the cover (such as 104) to the actuator assembly (such as 110) thereby minimizing the noise vibrations felt by the transducers (such as 118).

The damper (such as 154) preferably is a laminate of an annular disc (such as 170) of visco-elastic material and an annular constrain disc (such as 172) of a substantially rigid material. The constrain disc (such as 172) may be made of a polymer. It may alternatively be made of a metal such as aluminum.

The present invention may also be viewed as a disc drive (such as 100) having a rotatable disc (such as 108) carried by a spin motor (such as 106) mounted to a base plate (such as 102). The disc (such as 108) has a digital data storage media on a surface thereof, and there is an actuator assembly (such as 110) for positioning a transducer (such as 118) over the media. The actuator assembly (such as 110) is rotatably supported adjacent the disc between the base plate (such as 102). A cover (such as 104) extends over the actuator assembly (such as 110), the disc (such as 108), and the spin motor (such as 106). A cylindrical bearing cartridge (such as 112) is fastened to the baseplate (such as 102) and to the cover (such as 104) supporting the actuator assembly (such as 110) for rotation about an axis parallel to a rotation axis of the disc (such as 108). An annular visco-elastic damper disc (such as 154) is sandwiched between the bearing cartridge (such as 112) and the cover (such as 104) for absorbing vibrations transmitted by the cover (such as 104) to the actuator assembly (such as 110). The damper (such as 154) includes a laminate of an annular disc of visco-elastic material (such as 170) and an annular constrain disc of a substantially rigid material (such as 172). The viscoelastic disc (such as 170) is preferably made of a polymer. The constrain disc (such as 172) is preferably made of a rigid polymer or a metal.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, the damper 154 may be comprised of a series of thin layers of viscoelastic damping polymers optimized to attenuate different frequency ranges within the anticipated vibrational spectrum. The damper 154 may also be placed beneath the bearing shaft assembly 112 to attenuate vibrations transmitted through the base plate 102. Further, the damping polymer may be other than ISD-142 and the constrain layer may be a material other than a metal such as aluminum or a polymer such as polyurethane, so long as the damping polymer has desirable damping characteristics and the constrain layer has suitable rigidity for its purpose. The Accordingly all such changes and variations are encompassed in the spirit of the invention disclosed and as defined in the appended claims.

What is claimed is:

1. A disc drive having a rotatable disc carried by a spin motor mounted to a base plate, the disc having a data storage media thereon, and an actuator assembly rotatably supported adjacent the disc between the base plate and a cover over the actuator assembly, the disc and the spin motor, the disc drive comprising:

a bearing cartridge fastened to the base plate and to the cover supporting the actuator assembly for rotation about an axis parallel to a rotation axis of the disc; and a flat annular damper disc positioned between the bearing cartridge and the cover around a screw hole through the cover, wherein the damper disc comprises a laminate having a layer of visco-elastic material and a constraining layer of substantially rigid material and has a top surface contacting the cover and a bottom surface contacting the bearing cartridge to absorb vibrations transmitted by the cover to the actuator assembly.

2. The disc drive according to claim 1 wherein the damper disc laminate further comprises an adhesive layer.

3. The disc drive according to claim 1 wherein the constraining layer is made of a polymer.

4. The disc drive according to claim 1 wherein the constraining layer is made of a metal.

5. The disc drive according to claim 1 wherein the constraining layer is made of polyurethane.

6. A disc drive having a rotatable disc carried by a spin motor mounted to a base plate, the disc having a data storage media on a surface thereof, and an actuator assembly for positioning a transducer over the storage media rotatably supported adjacent the disc between the base plate, and a cover over the actuator assembly, the disc and the spin motor, the drive comprising:

a cylindrical bearing cartridge fastened to the base plate and to the cover supporting the actuator assembly for rotation about an axis parallel to a rotation axis of the disc; and a flat annular damper disc sandwiched between the bearing cartridge and the cover and positioned around a screw hole through the cover, wherein the damper disc comprises a laminate having a layer of visco-elastic material and a constraining layer of substantially rigid material and has a top surface contacting the cover and a bottom surface contacting the bearing cartridge for absorbing vibrations transmitted by the cover to the actuator assembly.

7. The disc drive according to claim 6 wherein the damper disc laminate further comprises an adhesive layer.

8. The disc drive according to claim 6 wherein the constraining layer is made of a polymer.

9. The disc drive according to claim 6 wherein the constraining layer is made of a metal.

10. A disc drive having a rotatable disc carried by a spin motor mounted to a base plate, the disc having a data storage media thereon, and an actuator assembly rotatably supported adjacent the disc between the base plate and a cover over the actuator assembly, the disc and the spin motor, the drive comprising:

a bearing cartridge fastened to the base plate and to the cover supporting the actuator assembly for rotation about an axis parallel to a rotation axis of the disc; and a damping means positioned between and contacting both the bearing cartridge and the cover centered around a screw hole through the cover, wherein the damping means comprises a laminate having a layer of visco-elastic material and a constraining layer of substantially rigid material for absorbing vibrations transmitted by the cover to the actuator assembly.

* * * * *